(12) United States Patent
Mjelde

(10) Patent No.: US 10,479,135 B2
(45) Date of Patent: Nov. 19, 2019

(54) OMNI-DIRECTIONAL WHEEL FOR POOL VACUUM HEAD

(71) Applicant: Olaf Mjelde, Ventura, CA (US)

(72) Inventor: Olaf Mjelde, Ventura, CA (US)

( * ) Notice: Subject to any disclaimer, the term of this patent is extended or adjusted under 35 U.S.C. 154(b) by 239 days.

(21) Appl. No.: 15/002,619

(22) Filed: Jan. 21, 2016

(65) Prior Publication Data

US 2017/0210164 A1    Jul. 27, 2017

(51) Int. Cl.
*B60B 19/00* (2006.01)
*B60B 19/12* (2006.01)
*E04H 4/16* (2006.01)

(52) U.S. Cl.
CPC ............ *B60B 19/003* (2013.01); *B60B 19/12* (2013.01); *E04H 4/1636* (2013.01)

(58) Field of Classification Search
CPC ..................................................... B60B 19/003
See application file for complete search history.

(56) References Cited

U.S. PATENT DOCUMENTS

| | | | |
|---|---|---|---|
| 1,305,535 A | 6/1919 | Grabowiecki | |
| 3,789,947 A | 2/1974 | Blumrich | |
| 4,715,460 A | 12/1987 | Smith | |
| D309,254 S | 7/1990 | Guile | |
| D318,219 S | 7/1991 | Guile | |
| D318,791 S | 8/1991 | Guile | |
| 5,518,238 A | 5/1996 | Hu | |
| 6,315,109 B1 * | 11/2001 | Dean | B60P 1/02 198/786 |
| 6,726,524 B2 | 4/2004 | Yamaguchi | |
| 6,757,936 B2 * | 7/2004 | Yamaguchi | B60B 19/003 16/47 |
| 7,318,628 B2 | 1/2008 | Guile | |
| 7,566,102 B2 | 7/2009 | Guile | |
| 7,641,288 B1 * | 1/2010 | Baker | B60B 19/003 301/5.23 |

(Continued)

OTHER PUBLICATIONS

38mm (1.5 inch) Double Plastic Omni Wheel (compatible with Servo Motor)14184 http://www.nexusrobot.com/product.php?id_product=184, Dec. 21, 2015.

(Continued)

*Primary Examiner* — Jason R Bellinger
(74) *Attorney, Agent, or Firm* — Robert J. Lauson, Esq.; Judd Patton, Esq.; Lauson & Associates

(57) ABSTRACT

An omni-directional wheel for a pool vacuum head includes a first frame and a second substantially identical frame, each frame having a hub rotating around a common axis, lower supports extending radially from the hub, risers extending from the hub along the common axis, and upper supports individually coupled to the risers, the upper supports extending radially from the common axis. Rollers coupled to the first frame and the second frame, are radially spaced from the common axis on each frame. The rollers rotate normal to the common axis to impart omni-directional movement. When the first frame and the second frame are interlocked, the risers on the first frame engage the hub on the second frame, and the lower supports on the first frame engaging the upper supports on the second frame, maintaining the rollers in a staggered arrangement around the wheel.

18 Claims, 5 Drawing Sheets

(56) References Cited

U.S. PATENT DOCUMENTS

| | | |
|---|---|---|
| D676,214 S | 2/2013 | McKinnon |
| 8,821,357 B2 | 9/2014 | Reid |
| D735,817 S | 8/2015 | Reid |
| 9,180,335 B1 | 11/2015 | Wu |
| 2009/0278325 A1* | 11/2009 | Geels ................. A61H 3/04 280/5.28 |
| 2017/0361648 A1* | 12/2017 | McKinnon ............ B60B 19/003 |

OTHER PUBLICATIONS

Omni Wheel—Wikipedia, https://en.wikipedia.org/wiki/Omni_wheel Jan. 7, 2016.

* cited by examiner

OMNI-DIRECTIONAL WHEEL FOR POOL VACUUM HEAD

BACKGROUND

Manual pool vacuums are known in the art. These apparatus typically include an operational head having a substantially planar bottom. Wheels on opposing sides of the head are installed to preserve the planar bottom just over the pool's surface. A hose typically installed centrally on the head connects to a pool filtration system. The pump of the filtration system draws water and debris toward the vacuum, under the vacuum head, through the hose and into the filter where debris is trapped. Since the bottom of the head is in close proximity to the pool surface, a Venturi effect is created, increasing suction at the vacuum head and making it more difficult to move along the pool's surface.

To operate the vacuum, the head is moved along the pool's surface using a long extendable pole connected to the vacuum head. The wheels are normally oriented on the head for back-and-forth motion. This is because users can exert back-and-forth pressure on the pole more easily than other directions. Although the customary back-and-forth motion is more efficient than other directions due to posture and the user's orientation to the vacuum head, users occasionally desire to sweep the vacuum head side-to-side in the event a portion of the pool's surface or errant debris is missed during a first pass. This side-to-side action, already difficult due to viscosity and suction, is made even more difficult because the wheels travel only in two directions.

Omni-directional wheels are also known in the art. Omni-directional wheels have small rollers around their circumference which are perpendicular to the axis of rotation, allowing them to be driven forward, backward, and side-to-side. State of the art omni-directional wheels are typically expensive to produce, having multiple different moving parts, and difficult to assemble, requiring fasteners or other mechanisms to hold them together. For these reasons they are disfavored for use in pool vacuums and other applications where cost and ease of use are at a premium.

It is therefore an object of the invention is to provide an omni-directional wheel for a pool vacuum head that rolls from side-to-side and diagonally in addition to back and forth. Another object of the invention is to provide an omni-directional wheel for a pool vacuum head that is simple and inexpensive to mold, and easy to assemble and install. Another object of the invention is to provide an omni-directional wheel that can be readily used on an existing pool vacuum head without changing the head's basic structure or theory of operation. These and other objects are more fully discussed in the following summary, description and claims.

SUMMARY

An omni-directional wheel includes at least two substantially identical interlocking frames. Each frame has a hub which is rotatable around a common axis allowing the frames to rotate together. Lower supports extend radially around the hub, and upper supports are coupled to the hub. The upper supports extend radially around the common axis, and the upper supports and the lower supports are in a radially staggered relationship around the common axis.

Rollers are retained by the lower supports and retained by the upper supports. To allow omni-directional movement, the rollers are oriented normal to the common axis and held in a staggered relationship around the wheel and present convex rolling faces. Optimally, the omni-directional wheel has two frames for holding the rollers, and the two frames are substantially identical. For mounting the omni-directional wheel on a pool vacuum head, the hubs each have a central hole.

While the lower supports are staggered around the hub and the upper supports staggered around the common axis, the lower supports and the upper supports are also preferably staggered along the common axis. To allow such a configuration, a plurality of risers is employed, connecting the upper supports to the hub. When the omni-directional wheel is assembled, the risers of each frame are interlocked. Preferably the risers are interlocked in a way that the risers releasably lock into the hub. Additionally, the lower supports and the upper supports are configured to releasably lock together to hold the wheel together.

In order to lock the rollers in position, each of the rollers comprises a spindle engaging channels formed in one of the plurality of lower supports and one of the plurality of upper supports. To hold the rollers on the lower supports and the upper supports, each lower support has a lower support head, and each upper support has an upper support head, with the lower support heads and the upper support heads distal from the hubs. The lower support heads and the upper support heads include the channels that hold the spindles extending from each of the rollers.

To lock the frames together, the risers each have a first post, and the hubs each have a first bore. The first posts and the first bores releasably lock together. For added resiliency in holding the rollers on the omni-directional wheel, the upper support heads each comprises a second post and the lower support heads each comprise a second bore, wherein the second posts and the second bores are releasably locked together. With the spindles locked in the channels on the lower support heads and the upper support heads, the rollers preferably extend radially farther from the common axis than the lower supports and the upper supports.

The frames may be characterized as a pair of essentially identical interlocking disc frames that form the omni-directional wheel and define its periphery or circumference. Each of the interlocking disc frames has a central hub defining a central axis for rotating the omni-directional wheel about the central axis, and rollers coupled or retained around the periphery or circumference of the wheel. Each of the rollers is oriented to roll about peripheral axes that are normal to the central axis. The rollers are preferably coupled to each of the interlocking disc frames in a staggered relationship around the periphery of the omni-directional wheel, allowing the wheel to move in multiple directions.

DESCRIPTION

Figure 1:
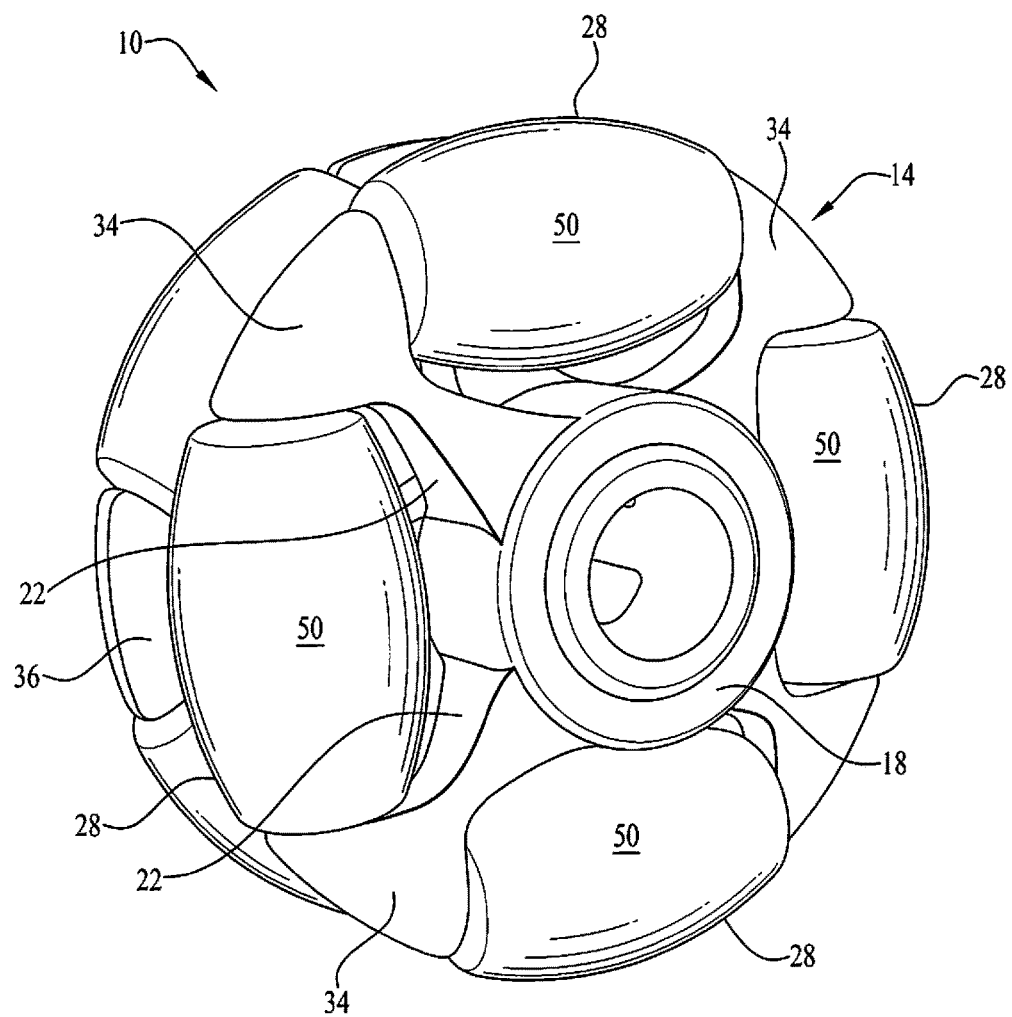
FIG. 1 illustrates a perspective view of an assembled omni-directional wheel for pool vacuum heads.
Figure 4:
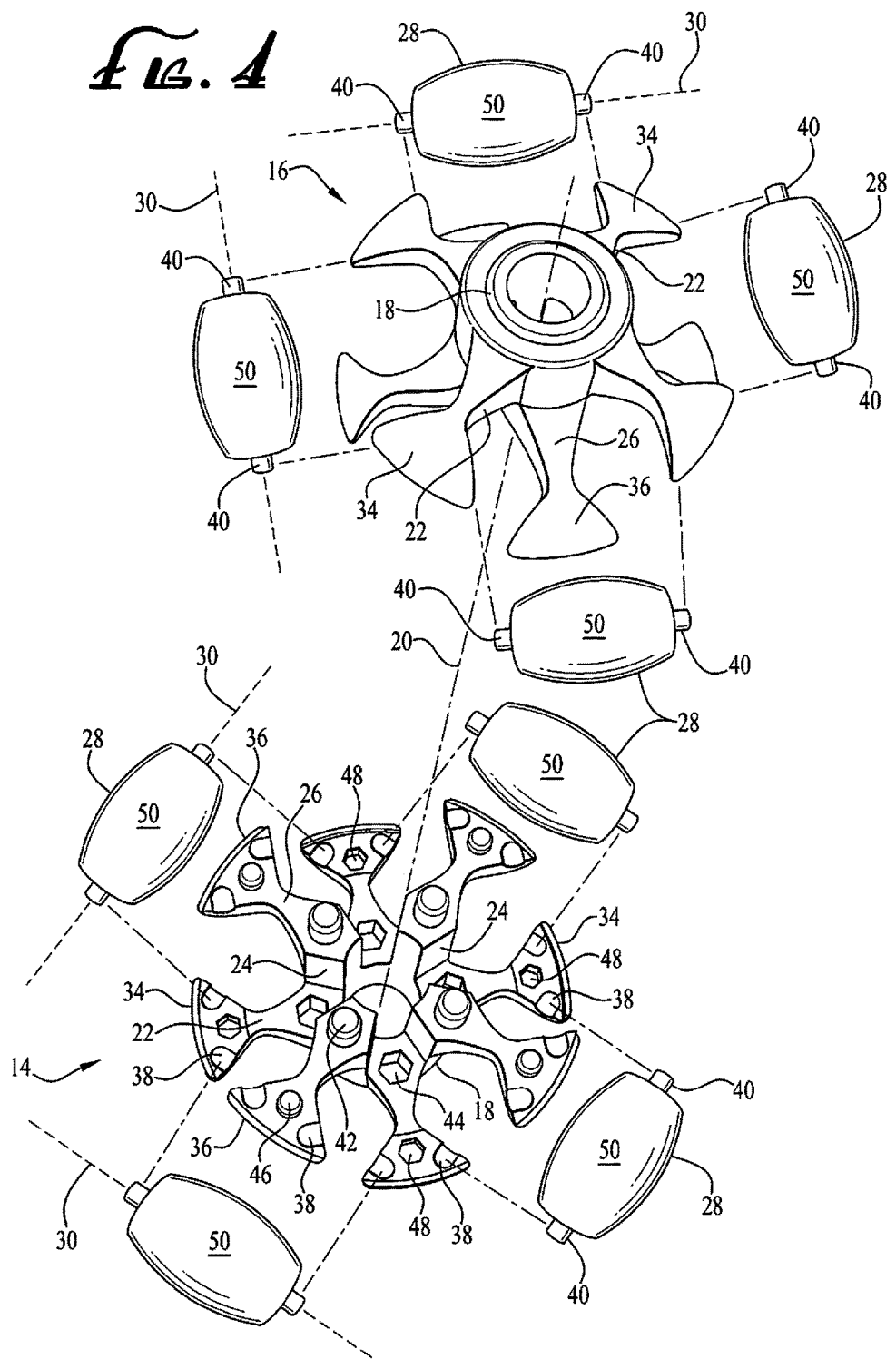
FIG. 4 illustrates an exploded view of the wheel.

Referring to FIG. 1, an omni-directional wheel 10 for a pool vacuum head 12 (FIG. 5) is constructed as a typical omni-directional wheel (i.e., a wheel rotating about an axis with rollers around the perimeter rotating normal to that axis). The wheel 10 includes a first frame 14 or disc frame 14 and a second frame 16 or second disc frame 16 (FIG. 4). Although referred to as different structures for illustration and clarity, the first frame 14 and the second frame 16 are virtually identical and therefore are interchangeable when constructing the wheel 10. When referring to sub-structures of the first frame 14, it is to be understood that the second frame 16 has the same sub-structures.

Still referring to FIG. 1, the first frame 14 includes a central hub 18 rotating around a central or common axis 20 (FIG. 4); i.e., an axis common to the first frame 14 and second frame 16, and perpendicular to the pool vacuum head's 12 conventional back-and-forth direction of travel. Multiple lower supports 22, four in the illustrated embodiment, extend from the central hub 18. A series of rollers 28 are mounted on the lower supports 22, allowing the pool vacuum head 12 to roll from side-to-side as well as back-and-forth. The first frame 14 also has upper support heads 36 that extend over the rollers' 28 rolling faces 50. The rolling faces 50 of the rollers 28 preferably textured to provide a gripping surface.

Figure 2:
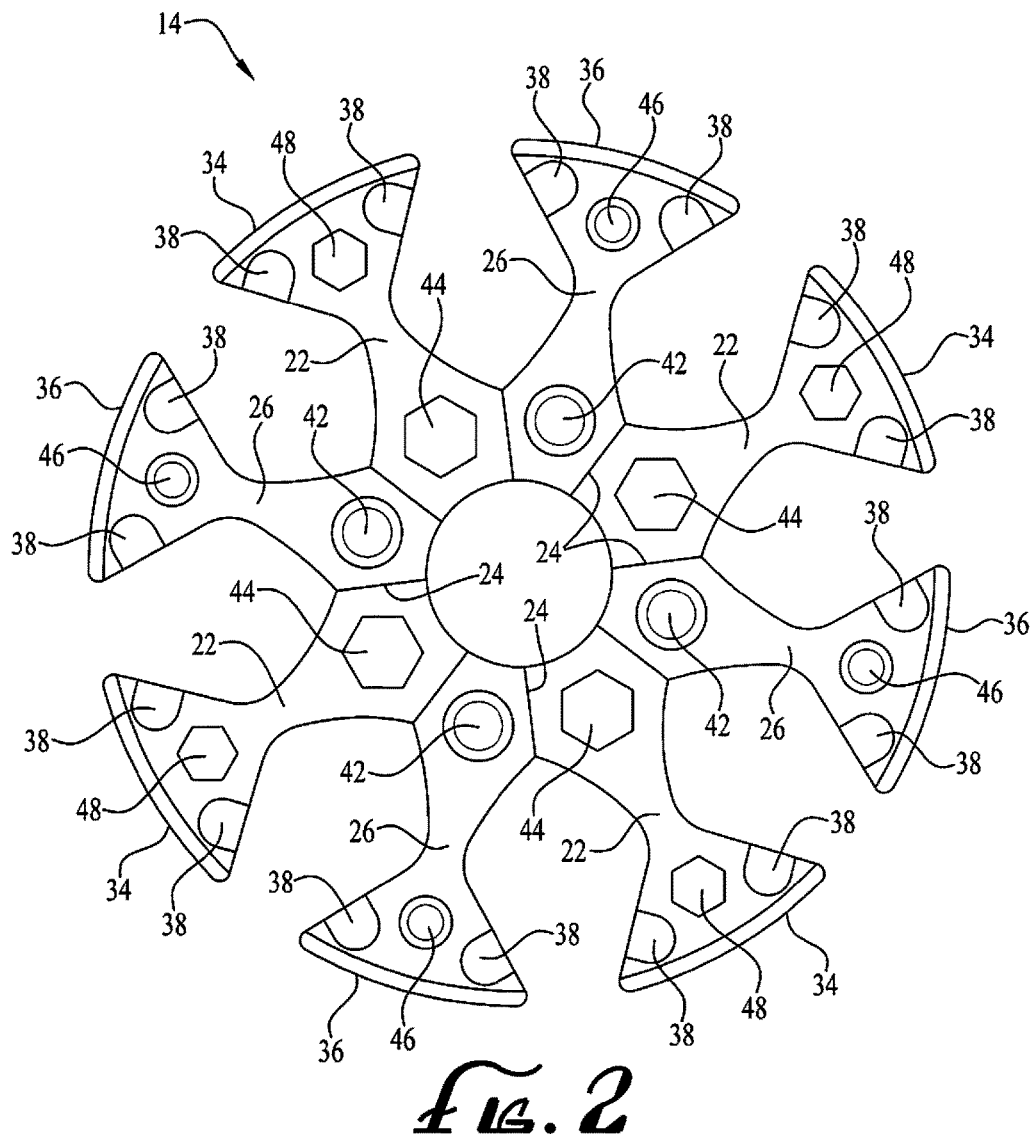
FIG. 2 illustrates an inside plan view of a frame for the wheel.

Referring to FIG. 2, The first frame 14 (and by extension, the second frame 16) includes risers 24 extending from the central hub 18 along the common axis 20. The risers 24 are preferably in a uniform alternating arrangement with the lower supports 22 around the central hub 18. The uniform alternating nature of the lower supports 22 and the risers 24 allow the first frame 14 to interlock with the second frame 16 in the process of forming a completed wheel 10.

The upper supports 26 project from the risers 24 to cover the rollers 28. Distal from the hub 18, the lower supports 22 each terminate in a lower support head 34 and the upper supports 26 each terminate in an upper support head 36. The lower supports 22 are configured relative to the upper supports 26 such that when the central hub 18 is in a downward vertical position, the upper supports 26 are elevated above the lower supports 22 along the common axis 20 (FIG. 4). In the illustrated embodiment, the lower support heads 34 and the upper support heads 36 are enlarged to support the rollers 28. Also in the illustrated embodiment, the rollers 28 have spindles 40 that engage the lower support heads 34 and the upper support heads 36 in channels 38 provided formed on either side of each lower support head 34 and upper support head 36.

Still referring to FIG. 2, as discussed the lower supports 22 and lower support heads 34 are in a uniform alternating arrangement with the risers 24 and the upper supports 26 and upper support heads 36 that extend from the risers 24. The arrangement allows the first frame 14 to interlock with the second frame 16 such that the spindles 40 are locked in complementary channels.

For locking the first frame 14 and the second frame 16 together, each riser 24 comprises a first post 42 and the hub 18 comprises first bores 44 sized complimentary to first posts 42 to releasably lock the first posts 42 therein. Likewise, the upper support heads 36 comprise second posts 46 and the lower support heads 34 comprise second bores 48 sized complimentary to the second posts 46 to releasably lock the second posts 46 therein.

Figure 3:
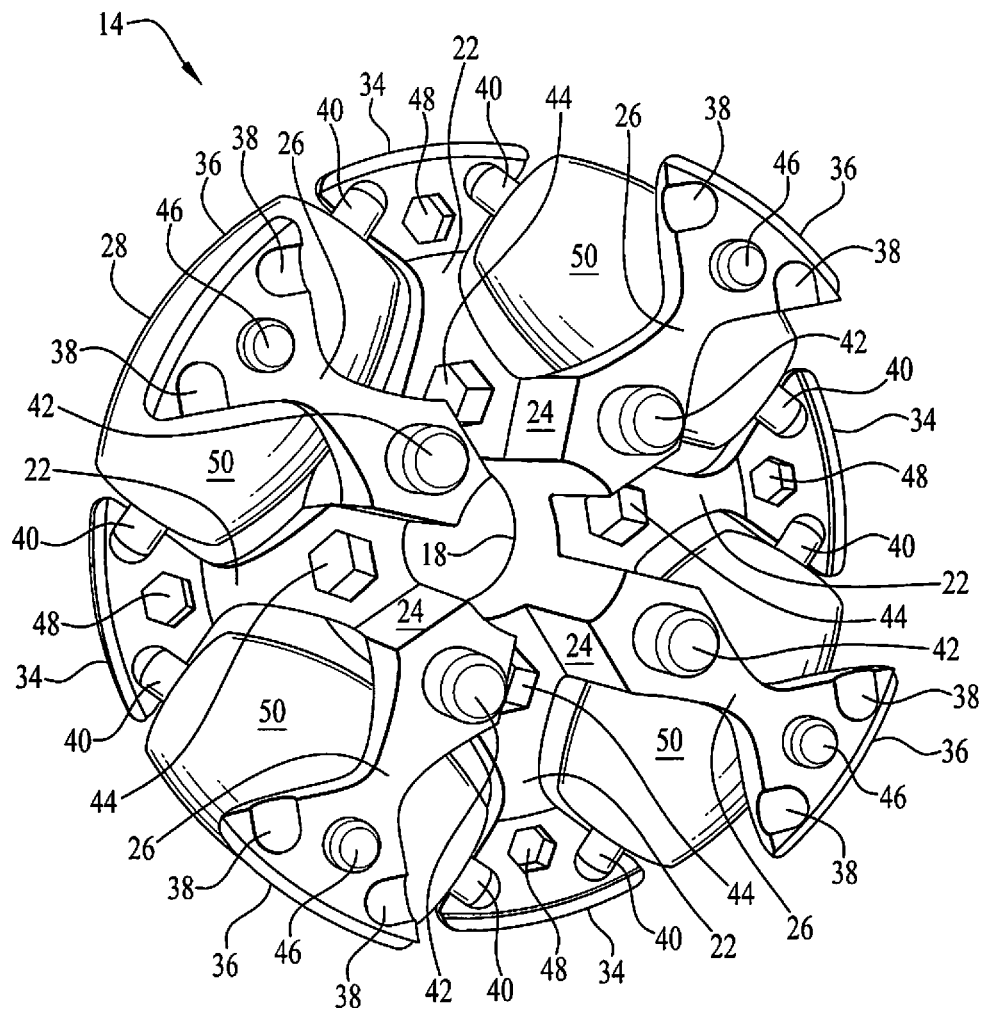
FIG. 3 illustrates a perspective view of the frame holding rollers.

Referring to FIG. 3, the first frame 14 is shown with the rollers 28 installed and ready for union with the second frame 16. Preferably, the risers 24 are disposed at a height such that the upper supports 26 conform to the rolling faces 50 of the rollers 28 while allowing sufficient space to remove the rollers 28 from under the upper supports 26. Because rollers are of uniform size, and because the first frame 14 and the second frame 16 are virtually identical and complimentary, the wheel 10 can be manufactured easily and inexpensively using only two molds.

Referring to FIG. 4, the first frame 14 and the second frame 16 are shown in the process of forming the wheel. Although rollers 28 are not shown on the second frame 16 for clarity and purposes of illustration, they would be installed in the same manner as shown on the first frame 14. The lower supports 22 and the upper supports 28 are uniformly alternating. Because the risers 24 are all of uniform height, when the second frame 16 is brought against the first frame 14, the rollers 28 are locked in the channels 38. The wheel 10 is held together since the first posts 42, first bores 44, second posts 46 and second bores 48 of the first frame 14 engage those of the second frame 16.

Figure 5:
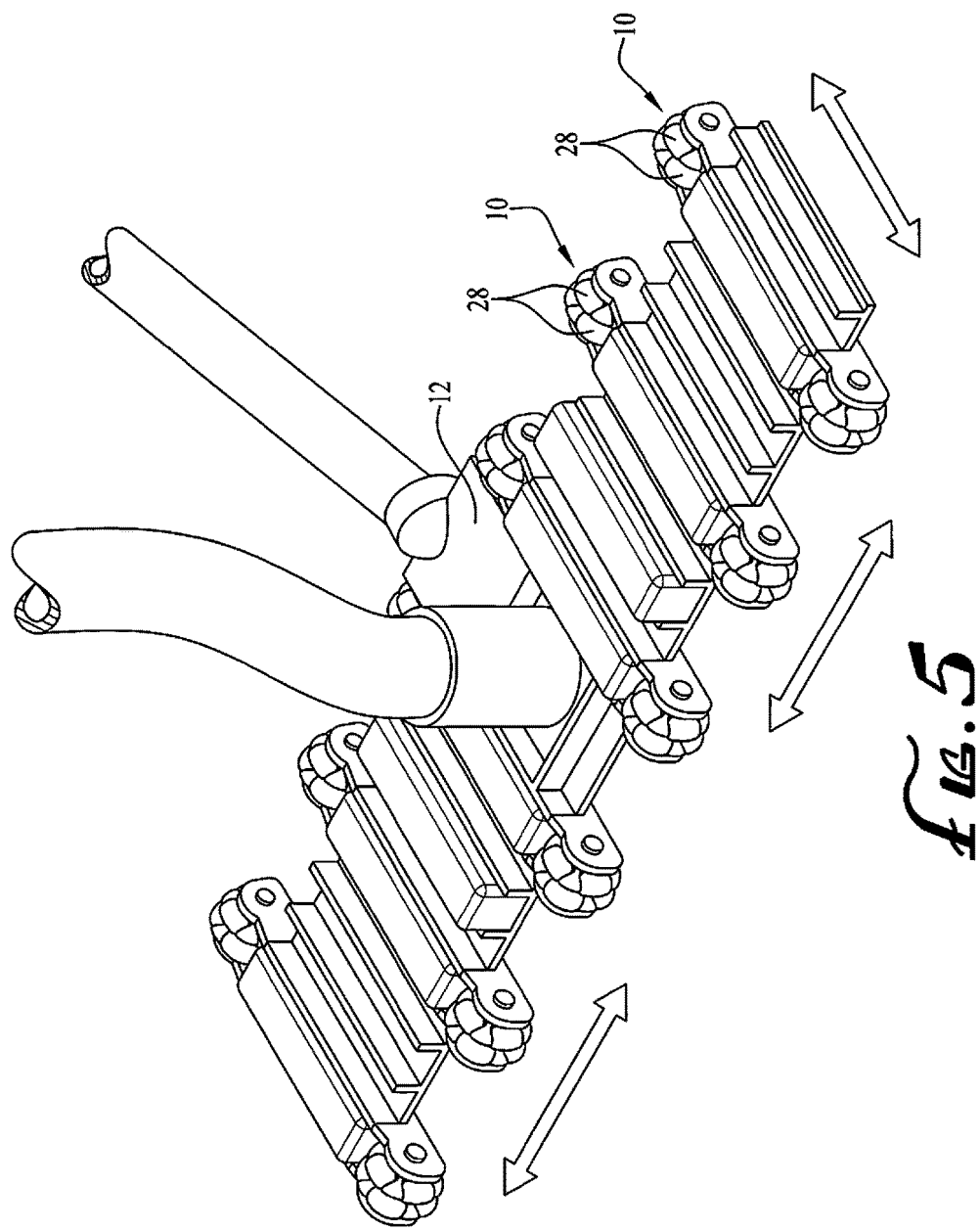
FIG. 5 illustrates a pool vacuum head bearing several wheels.

Referring to FIG. 5, with the first frame 14 and the second frame 16 assembled with all of the rollers 28, multiple wheels 10 are ready for installation on a conventional pool vacuum head 12. Since the rollers are installed on peripheral axes 30 also defined as axis normal to the common axis 20, they rotate perpendicular to the common axis 20. The omni-directional nature of the wheels 10 allows the pool vacuum head to roll in a conventional back-and-forth motion, and/or a side-to-side motion as illustrated.

The structure of the wheel 10 having been shown and described, its method of use will now be discussed.

A plurality of rollers 28 are initially installed on the lower supports 22 of the first frame 14 so that the spindles 40 rest in the channels 38 of the lower support heads 34, able to rotate freely under the upper supports 26. A complimentary second frame 16 including rollers 28 similarly installed is interlocked with the first frame 14 thereby creating the wheel 10. A plurality of wheels 10 are installed in lieu of conventional wheels (not shown) on a pool vacuum head 12. A user can then vacuum a pool surface (not shown), by rolling the pool vacuum head 12 in any desired direction on the surface.

The foregoing description of the preferred embodiment of the Invention is sufficient in detail to enable one skilled in the art to make and use the invention. It is understood, however, that the detail of the preferred embodiment presented is not intended to limit the scope of the invention, in as much as equivalents thereof and other modifications which come within the scope of the invention as defined by the claims will become apparent to those skilled in the art upon reading this specification.

What is claimed is:

1. An omni-directional wheel comprising:
    a plurality of substantially identical interlocking frames;
    each frame comprising a hub rotatable around a common axis;
    a plurality of lower supports extending radially around the hub;
    a plurality of upper supports coupled to the hub extending radially around the common axis, the upper supports and the lower supports in a circumferentially staggered relationship around the common axis wherein the upper supports are elevated relative to the lower supports when the common axis is vertically oriented; and
    a plurality of rollers retained by the lower supports and the upper supports, the rollers oriented normal to the common axis and held in a radially staggered relationship around the wheel.

2. The omni-directional wheel of claim 1 wherein the plurality of frames is two frames.

3. The omni-directional wheel of claim 1 wherein the lower supports and the upper supports are staggered along the common axis in addition to being staggered around the common axis.

4. The omni-directional wheel of claim 1 further comprising a plurality of risers connecting the upper supports to the hub.

5. The omni-directional wheel of claim 4 wherein the risers of each frame are interlocked.

6. The omni-directional wheel of claim 4 wherein the risers releasably lock into the hub.

7. The omni-directional wheel of claim 1 wherein the lower supports and the upper supports are configured to releasably lock together.

8. The omni-directional wheel of claim 1 wherein each of the rollers comprises a spindle engaged in a channel formed in one of the plurality of lower supports and one of the plurality of upper supports.

9. The omni-directional wheel of claim 1 wherein each of the rollers comprises a convex rolling face.

10. An omni-directional wheel for a pool vacuum head, the wheel comprising:
 a first frame and a second frame each having a hub rotating around a common axis, a plurality of lower supports extending radially from the hub, a plurality of risers extending from the hub along the common axis, and a plurality of upper supports individually coupled to the risers, the upper supports extending radially from the common axis; and
 a plurality of rollers retained in the first frame and the second frame, the rollers radially spaced from the common axis and rotating normal to the common axis;
 the first frame and the second frame interlocked, with the risers on the first frame engaging the hub on the second frame, and the lower supports on the first frame engaging the upper supports on the second frame, maintaining the rollers in a staggered position around the wheel wherein the upper supports are elevated relative to the lower supports along the common axis when the hub is vertically oriented.

11. The omni-directional wheel of claim 10 wherein the first frame and the second frame are substantially identical.

12. The omni-directional wheel of claim 10 wherein the hubs each comprise a central hole for mounting the wheel on the pool vacuum head.

13. The omni-directional wheel of claim 10 wherein the lower supports each comprise a lower support head, and the upper supports each comprise an upper support head, the lower support heads and the upper support heads distal from the hubs.

14. The omni-directional wheel of claim 13 wherein the lower support heads and the upper support heads each comprise channels for holding a spindle extending from one of the plurality of rollers.

15. The omni-directional wheel of claim 10 wherein the risers each comprise a first post and the hubs each comprise a first bore, wherein the first posts and the first bores are releasably locked together.

16. The omni-directional wheel of claim 10 wherein the upper support heads each comprise a second post and the lower support heads each comprise a second bore, wherein the second posts and the second bores are releasably locked together.

17. The omni-directional wheel of claim 10 wherein the rollers extend radially farther from the common axis than the lower supports and the upper supports.

18. The omni-directional wheel of claim 10 wherein the rollers each comprise a convex rolling face.

* * * * *